United States Patent
Keep

(10) Patent No.: US 6,277,905 B1
(45) Date of Patent: Aug. 21, 2001

(54) PROCESS FOR IMPROVING THE TOUGHNESS OF PCT FORMULATIONS BY ADDING RUBBER IMPACT MODIFIERS

(75) Inventor: Gerald Timothy Keep, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/450,554

(22) Filed: Nov. 30, 1999

Related U.S. Application Data

(60) Provisional application No. 60/155,631, filed on Sep. 23, 1999.

(51) Int. Cl.$^7$ ............... C08K 5/34; C08K 5/49; C08K 5/06; C08K 3/10
(52) U.S. Cl. ............ 524/94; 524/120; 524/153; 524/372; 524/411; 524/445; 524/449; 524/451; 524/494
(58) Field of Search ............... 524/87, 89, 94, 524/153, 120, 494, 411, 372, 445, 449, 451

(56) References Cited

U.S. PATENT DOCUMENTS

| | | |
|---|---|---|
| 2,465,319 | 3/1949 | Whinfield et al. . |
| 3,047,539 | 7/1962 | Pengilly . |
| 3,356,646 | 12/1967 | Wynstra et al. . |
| 3,435,093 | 3/1969 | Cope . |
| 3,562,200 | 2/1971 | Jones et al. . |
| 3,578,729 | 5/1971 | Brinkmann et al. . |
| 3,580,965 | 5/1971 | Brinkmann et al. . |
| 3,624,024 | 11/1971 | Caldwell et al. . |
| 3,868,388 | 2/1975 | Dotson, Jr. et al. . |
| 3,873,567 | 3/1975 | Cyba . |
| 3,915,930 | 10/1975 | Dotson, Jr. et al. . |
| 3,923,734 | 12/1975 | Dotson, Jr. et al. . |
| 4,001,179 | 1/1977 | Richter et al. . |
| 4,003,862 | 1/1977 | Albright . |
| 4,087,441 | 5/1978 | Lee . |
| 4,092,345 | 5/1978 | Wolford et al. . |
| 4,096,202 | 6/1978 | Farnham et al. . |
| 4,125,535 | 11/1978 | Wolford . |
| 4,167,505 | 9/1979 | Dunkelberger . |
| 4,172,859 | 10/1979 | Epstein . |
| 4,284,540 | 8/1981 | Iida et al. . |
| 4,303,573 | 12/1981 | Ostapchenko . |
| 4,313,903 | 2/1982 | Bier . |
| 4,346,195 | 8/1982 | Hornbaker et al. . |
| 4,374,220 | 2/1983 | Sonnenberg . |
| 4,461,871 | 7/1984 | Kometani et al. . |
| 4,495,324 | 1/1985 | Chacko et al. . |
| 4,533,679 | 8/1985 | Rawlings . |
| 4,581,396 | 4/1986 | Sonnenberg . |
| 4,594,386 | 6/1986 | Olivier . |
| 4,659,757 | 4/1987 | Okamoto et al. . |
| 4,719,256 | 1/1988 | Markezich . |
| 4,753,980 | 6/1988 | Deyrup . |
| 4,762,871 | 8/1988 | Kriek . |
| 4,778,820 | 10/1988 | Minnick . |
| 4,879,328 | 11/1989 | Karasawa et al. . |
| 4,914,212 | 4/1990 | Khuddus et al. . |
| 4,965,111 | 10/1990 | Pratt et al. . |
| 4,997,953 | 3/1991 | McKenna . |
| 5,021,495 | 6/1991 | Minnick . |
| 5,076,970 | 12/1991 | Roos et al. . |
| 5,137,948 | 8/1992 | Bonnet et al. . |
| 5,194,468 | 3/1993 | Abu-Isa et al. . |
| 5,219,941 | 6/1993 | Meyer, Jr. et al. . |
| 5,242,967 | 9/1993 | Minnick . |
| 5,244,972 | 9/1993 | Phadke . |
| 5,278,230 | 1/1994 | Bell . |
| 5,280,066 | 1/1994 | Tekkanant et al. . |
| 5,281,663 | 1/1994 | Gelles et al. . |
| 5,284,903 | 2/1994 | Minnick . |
| 5,290,945 | 3/1994 | Roy et al. . |
| 5,317,048 | 5/1994 | Tarbit et al. . |
| 5,322,893 | 6/1994 | Moffett et al. . |
| 5,376,712 | 12/1994 | Nakajima . |
| 5,407,999 | 4/1995 | Hert et al. . |
| 5,424,361 | 6/1995 | De Rudder . |
| 5,428,086 | 6/1995 | Minnick et al. . |
| 5,436,296 | 7/1995 | Swamikannu et al. . |
| 5,552,460 | 9/1996 | Schmidt et al. . |
| 5,618,881 | 4/1997 | Hojabr . |
| 5,652,306 | 7/1997 | Meyer et al. . |
| 5,670,575 | 9/1997 | Flexman, Jr. . |

FOREIGN PATENT DOCUMENTS

| | | |
|---|---|---|
| 0 400 936 A1 | 12/1990 | (EP) . |
| 0 838 501 A2 | 4/1998 | (EP) . |
| 1287934 | 9/1972 | (GB) . |

Primary Examiner—Kriellion Sanders
(74) Attorney, Agent, or Firm—Betty J. Boshears; Cheryl Tubach; Bernard Graves

(57) ABSTRACT

This invention relates to a process for improving the toughness of a polymer composition comprising blending:

(A) a polyester comprising:
  (1) terephthalic acid in the amount of 85 to 100 mole % based on the mole percentages of the dicarboxylic acid component equaling a total of 100 mole %.
  (2) a glycol component comprising from about 60 to 100 mole % 1,4-cyclohexanedimethanol based on the total percentages of the glycol component equaling a total of 100 mole %;

(B) one or more rubber impact modifiers;

(C) one or more halogenated organic compounds containing at least one imide group having a melting point of greater than 240° C.; and (D) reinforcing fiber.

56 Claims, No Drawings

PROCESS FOR IMPROVING THE TOUGHNESS OF PCT FORMULATIONS BY ADDING RUBBER IMPACT MODIFIERS

CROSS REFERENCE TO RELATED APPLICATIONS

This application claims priority upon provisional application Ser. No. 60/155,631 filed Sep. 23, 1999, and the No. 60/155,631 application is herein incorporated by this reference in its entirety.

FIELD OF THE INVENTION

This invention relates to a process for improving the toughness of a fiber reinforced, flame retardant (FR) poly (cyclohexylenedimethylene terephthalate) (PCT) formulation.

BACKGROUND OF THE INVENTION

Certain electronics must be soldered at high temperatures and require high heat deflection temperature (HDT) materials. Such materials typically have high melting points and thus must be melt processed at relatively high temperatures. PCT is a high-melting polyester with a melting point of about 290° C. and, consequently, is very challenging to formulate while retaining good molecular weight. In addition to good melt stability, good dimensional stability, flammability, and toughness characteristics are important.

In the industry, use of tougheners in polymers has been known for some time. However, in most cases, HDT is sacrificed in order to achieve the characteristic of toughness.

U.S. Pat. No. 5,021,495 by Minnick discloses high temperature glass fiber reinforced, flame retardant PCT formulations. In the Minnick patent, it is shown that use of functional olefins (not acrylate/methacrylate rubber impact modifiers) can improve flame retardancy without hurting dimensional stability. These materials did not improve the toughness of the PCT formulations.

U.S. Pat. No. 5,428,086 discloses high temperature glass fiber reinforced, flame retardant PCT formulations. This patent discloses that certain additives can compromise the dimensional stability of the PCT formulation.

BRIEF SUMMARY OF THE INVENTION

This invention relates to a process for improving the toughness of a polymer composition comprising blending:
(A) a polyester comprising:
  (1) terephthalic acid in the amount of 85 to 100 mole % based on the mole percentages of the dicarboxylic acid component equaling a total of 100 mole %.
  (2) a glycol component comprising from about 60 to 100 mole % 1,4-cyclohexanedimethanol based on the mole percentages of the glycol component equaling a total of 100 mole %;
(B) one or more rubber impact modifiers;
(C) one or more halogenated organic compounds containing at least one imide group having a melting point of greater than 240° C.; and
(D) reinforcing fiber.

A preferred embodiment of the composition useful in this invention comprises sodium antimonate and or one or more phosphorous based compounds.

The polymer composition useful in the process of this invention has improved dimensional stability, improved toughness, and improved flammability characteristics that are particularly useful in high temperature electronics. Certain embodiments of the composition useful in this invention also have improved melt stability.

DETAILED DESCRIPTION

This invention relates to a process for improving the toughness of a fiber reinforced, flame retardant (FR) poly (cyclohexylenedimethylene terephthalate) (PCT) formulation. Dimensional stability and flammability characteristics are also improved in the process of this invention.

Specifically, the formulation produced by the process of this invention simultaneously achieves improved dimensional stability (as demonstrated by Heat Deflection Temperature above 260° C.) and improved toughness (as demonstrated by tensile elongation as measured by ASTM Method 638). At the same time, formulations must have acceptable flammability characteristics to be useful. This is typified by UL-94 flammability testing. Also, the relative hazard or environmental load of the metallic synergist can be considered in evaluating the usefulness of the invention.

It is preferred in this invention that the polyester comprise 90 mole % or more of terephthalic acid based on the mole percentages of the dicarboxylic acid component of the polyester equaling a total of 100 mole %. By terephthalic acid, suitable synthetic equivalents, such as dimethyl terephthalate, are included.

The polyester useful in this invention comprises 0 to 15 mole %, preferably 0 to 10 mole %, of dicarboxylic acids other than terephthalic acid, based on the mole percentages of the dicarboxylic acid component of the polyester equaling a total of 100 mole %. The other dicarboxylic acids include, but are not limited to, aromatic dicarboxylic acids preferably having 4 to 40 carbon atoms, more preferably, 8 to 14 carbon atoms; aliphatic dicarboxylic acids having, preferably 4 to 40 carbon atoms, more preferably, 4 to 12 carbon atoms; or cycloaliphatic dicarboxylic acids having 4 to 40 carbon atoms, more preferably, 8 to 12 carbon atoms.

Particularly preferred examples of other dicarboxylic acids useful in forming the copolyester useful in this invention include, but are not limited to, isophthalic acid, naphthalenedicarboxylic acid, cyclohexanedicarboxylic acid, 1,4-cyclohexanediacetic acid, diphenyl-4,4'-dicarboxylic acid, naphthalenedicarboxylate, succinic acid, glutaric acid, adipic acid, azelaic acid, sebacic acid, and the like.

Of these, isophthalic acid, naphthalenedicarboxylic acid, cyclohexanedicarboxylic acid and naphthalenedicarboxyate are preferred, either singly or in combination.

When cyclohexanedicarboxylic acid is used as a comonomer in the context of the invention, trans-, cis-, or cis/trans mixtures may be used.

Any of the naphthalenedicarboxylic acid isomers or mixtures of isomers may be used. Some preferred naphthalenedicarboxylic acid isomers include 2,6-, 2,7- 1,4- and 1,5- isomers.

It should be understood that "dicarboxylic acids" includes the corresponding acid anhydrides, esters, and acid chlorides of these acids. In the acid component of this invention, the mole percentages of the acids of the polyester referred to herein equal a total of 100 mole %.

In the glycol component of the polyester useful in this invention, the mole percentages of the glycols referred to herein equal a total of 100 mole %.

It is preferred that the glycol component of the polyester useful in the invention contain from about 80 to 100 mole %, preferably 90 to 100 mole %, of one or more isomers of 1,4-cyclohexanedimethanol.

Preferably, the polyesters useful in this invention may be based on trans-, or cis/trans mixtures of 1,4-cyclohexanedimethanol. For example, a 30/70 cis/trans mixture of the isomers may be readily used.

The glycol component may comprise up to 20 mole %, and more preferably, up to 10 mole %, of one or more other aliphatic or alicyclic glycols.

Such additional diols include cycloaliphatic diols preferably having 6 to 20 carbon atoms or aliphatic diols preferably having 2 to 20 carbon atoms. Examples of such diols are: ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, decalin diol, and 2,2-bis-(4-hydroxypropoxyphenyl)-propane. Copolyesters may be prepared from the above diols in addition to the 1,4-cyclohexanedimethanol.

It is more preferred that the one or more glycols are selected from ethylene glycol, diethylene glycol, triethylene glycol, propanediol, butanediol, pentanediol, hexanediol, and tetramethylcyclobutanediol.

When the polyester of the process of this invention contains ethylene glycol, it is preferable that the ethylene glycol be present in an amount less than 20 mole %, more preferably, less than 10 mole %.

Copolyesters containing substantially only 1,4-cyclohexanedimethanol and terephthalic acid or substantially only 1,4-cyclohexanedimethanol, isophthalic, and terephthalic acid are preferred.

The polyester resins useful in this invention are well known and are commercially available. By the term "polyester", copolyesters are also intended. Methods for their preparation are described, for example, in U.S. Pat. No. 2,465,319 and 3,047,539. For example, the polyesters can be prepared by direct condensation of terephthalic acid or ester interchange using dimethyl terephthalate with the selected glycol.

Typical catalysts which may be used to make these copolyesters include titanium alkoxides, dibutyl tin dilaurate, combinations of zinc, manganese, or magnesium acetates or benzoates with antimony oxide or antimony triacetate.

The polyesters useful in the invention preferably have an inherent viscosity of 0.1 to 2.0 dL/g, more preferably 0.3 to 1.5 dL/g, and even more preferably, 0.4 to 1.2 dL/g as measured at a temperature of 25° C. for a 0.5 gram sample in 100 ml of a solvent consisting of 60% by weight phenol and 40% by weight tetrachloroethane.

It is preferred that the copolyester useful herein have a melting point of greater than 260° C., more preferably greater than 270° C. In some embodiments, the copolyester has a melting point of 260° C. to 310° C.

Melting points for the polyester resins useful in the invention and for the halogenated imides of the invention are measured by DSC (differential scanning calorimetry) analysis.

The invention is meant to incorporate all melt processing methods known in the art.

As used herein, the term "melt processing" refers to any processing step commonly used in the art for polyesters or copolyesters which occurs after the polyesters or copolyesters are heated to their melting temperature or melting point. This includes, but is not limited to, injection molding, calendering, extrusion, and rotational molding.

It is also preferred within the context of this invention that the polymer composition useful in the invention undergoes less than a 50%, preferably 25%, and more preferably 15% loss in number average molecular weight as determined by gel permeation chromatography when melt processed at 25° C. above the crystalline melting temperature (Tm) for 10 minutes.

The copolyesters useful in the invention may be combined with additives, branching agents, reinforcing agents, and the like either during polymerization or after polymerization to form a copolyester composition.

The second component of the composition useful in the invention is an halogenated organic compound containing at least one imide group and having a melting point greater than 240° C. Useful families of imide-group containing compounds include N,N'-arylenediphthalimides wherein the arylene group includes phenylene, diphenylene, naphthylene and sulfone bridged bisphenyls, tetrabrominated phthalimides, N,N'bis(dibromocyclohexane dicarboxyimides) with various bridging groups, and N,N'-alkylenebis(tetrahalophthalimides).

Preferred imide group containing compounds are those corresponding to the following formula:

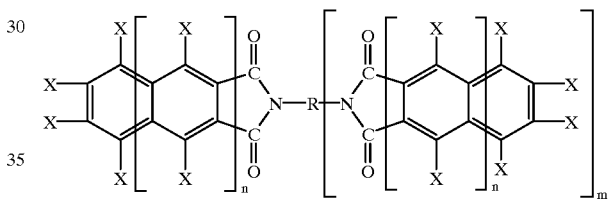

wherein both n and m may be 1 or 0, X may be halogen, particularly chlorine or bromine, or hydrogen, and R is a $C_1$ to $C_6$ alkyl group, a single bond, a phenylene group, a toluene group, a cyclohexylene group, a bis phenyl methane group, a bis cyclohexylmethane group, or a naphthylene group.

The N,N'-alkylenebis(tetrahalophthalimides) suitable in the present invention and a process for their production are described in U.S. Pat. No. 4,087,441, incorporated herein by reference. The preferred N,N'-alkylenebis(tetrahalophthalimides) are represented by the formula:

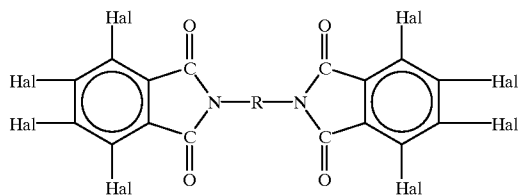

wherein R represents a $C_1$–$C_6$ alkyl group, preferably a $C_2$–$C_6$ alkyl group, and most preferably an ethyl group, and Hal which may be the same or different, represents a halogen atom, preferably Br or Cl, and most preferably Br.

The most particularly preferred N,N'-alkylenebis (tetrahalophthalimide) is N,N'-ethylenebis (tetrabromophthalimide) (R is an ethyl group and Hal is a Br atom). These types of imide group containing components are described in U.S. Pat. Nos. 3,624,024 and 3,873,567 and British Pat. No. 1,287,934.

Other suitable imide group containing compounds include 1,4,5,6-tetrabromo-2,3-phthaloimide; N methylol-tetrabromophthalimide; N,N-bis-(1,4,5,6-tetrabromo-2,3-phthaloimide); N,N'-p-phenylene-diphthalimide; N,N'-diphthalimidodiphenyl; bis-(Nphenyl-phthalimido)sulphone; N,N'-p-phenylene-di-tetrachlorophthalimide; 4,4'-ditetrachlorophthalimidodiphenyl; N-(tetrachlorophthalimido)-tetrachlorophthalimide, N,N'-p-phenylene-di-tetrabromophthalimide; N,N'-di-tetrabromophthalimidodiphenyl; N-(tetrabromophthalimido)-tetrabromophthalimide; N,N'-bis-(5,6-dibromocyclohexane-2,3-dicarboximide); and N,N'-(1,2ethane)-bis-(5,6dibromocyclohexane-2,3-dicarboximide).

Further suitable imide containing compounds are disclosed in U.S. Pat. Nos 3,868,388; 3,873,567; 3,915,930; 3,923,734; 4,001,179 and 4,003,862. Suitable imides are also disclosed in British Pat. No. 1,287,934 and are incorporated herein by reference.

Preferred imides which have a melting point above 240° C., preferably above 300° C., which includes bis-imides made from aromatic or aliphatic diamines, including ethylene diamine, or hydrazine, and tetrabromophthalic anhydride or acid are preferred. The most preferred flame retardant is the imide from reacting tetrabromo phthalic acid (anhydride) with ethylene diamine. This is sold commercially as Saytex BT-93 and BT-93W. This flame retardant has a high bromine content. It is thermally stable to processing temperatures characteristic of PCT, and does not soften below the PCT melting point. This class of phthalimides has an advantage over other high temperature bromine sources like decabromodiphenyl in that they are not singled out as having the same environmental concerns (dioxins/furans).

It is preferred that the sum of all flame retardants used in this invention is 5–30%, preferably 10–20%, by weight of the total composition. One or more flame retardants may be used within the context of this invention.

Brominated phthalimides are high melting materials, in contrast to other brominated flame retardants, and provide superior HDT. However, the combination of PCT and BPI is especially challenging from a melt stability standpoint. The preferred FR synergists with PCT/BPI system are not the same as with lower melting point materials like PBT (Tm=220° C.) or PET (Tm=250° C.).

A number of patents describe processes for preparing brominated phthalimides, for example, U.S. Pat. No. 4,997,953; 5,076,970; 5,290,945; 5,137,948; and 5,317,048, all of which are incorporated herein by reference.

The novel molding materials furthermore preferably contain from 0 to 15%, preferably, 5 to 7%, by weight of rubber impact modifiers based on the total weight of the compositions. By "rubber impact modifiers", impact modifiers that have rubbery physical properties are intended. These include, in particular, those capable of making the polymers of the invention tougher. These properties are met by, for example, EP or EPDM rubbers which are grafted or copolymerized with suitable functional groups. For example, maleic anhydride, itaconic acid, acrylic acid, glycidyl acrylate and glycidyl methacrylate are suitable for this purpose.

These monomers can be grafted onto the polymer in the melt or in solution, in the presence or absence of a free radical initiator such as cumene hydroperoxide.

Further suitable rubber impact modifiers are copolymers of alpha-olefins. The alpha-olefins are usually monomers of 2 to 8 carbon atoms, preferably ethylene and propylene. Alkyl acrylates or alkyl methacrylates derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers may also be used. Copolymers of ethylene with ethyl or butyl acrylate and acrylic acid and/or maleic anhydride have proven particularly suitable. Copolymers of ethylene, methyl acrylate and glycidyl methacrylate are preferred. Also, copolymers of ethylene plus methyl acrylate are preferred. It is also preferred that the latter two copolymer types be present in the invention as a mixture.

The copolymers can be prepared in a high pressure process at from 400 to 4500 bar or by grafting the comonomers onto the poly-alpha-olefin. The alpha-olefin content of the copolymer is in general from 99.95 to 55% by weight.

A further group of suitable impact modifiers comprises core-shell graft rubbers. These are graft rubbers prepared in emulsion and consisting of at least one hard and one soft component. A hard component is usually understood as meaning a polymer having a glass transition temperature of at least 25° C., and a soft component as meaning a polymer having a glass transition temperature of not more than 0° C. These products have a structure having a core and at least one shell, the structure being determined by the order of addition of the monomers. The soft components are generally derived from butadiene, isoprene, alkyl acrylates, alkyl methacrylates or siloxanes and, if required, further comonomers. Suitable siloxane polymers can be prepared, for example, starting from cyclic octamethyltetrasiloxane or tetravinyltetramethyltetrasiloxane. These polymers can be prepared by ring-opening cationic polymerization, for example using gamma-mercaptopropylmethyldimethoxysilane, preferably in the presence of sulfonic acids. The siloxanes may also be cross-linked by, for example, carrying out the polymerization reaction in the presence of silanes having hydrolyzable groups, such as halogen or alkoxy, e.g. tetraethoxysilane, methyltrimethoxysi lane or phenyltrimethoxysi lane. Examples of suitable comonomers here are styrene, acrylonitrile and crosslinking or graft-active monomers having more than one polymerizable double bond, such as diallyl phthalate, divinylbenzene, butanediol diacrylate or triallyl (iso)cyanurate. The hard components are derived in general from styrene, alpha-methylstyrene and copolymers thereof, acrylonitrile, methacrylonitrile and methylmethacrylate preferably being used as comonomers.

Preferred core-shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl groups,are preferably incorporated here by adding suitable functionalized monomers in monomers. The soft components are generally derived from butadiene, isoprene, alkyl acrylates, alkyl methacrylates or siloxanes and, if required, further comonomers. Suitable siloxane polymers can be prepared, for example, starting from cyclic octamethyltetrasiloxane or tetravinyltetramethyltetrasiloxane. These polymers can be prepared by ring-opening cationic polymerization, for example using gamma-mercaptopropylmethyldimethoxysilane, preferably in the presence of sulfonic acids. The siloxanes may also be cross-linked by, for example, carrying out the polymerization reaction in the presence of silanes having hydrolyzable groups, such as halogen or alkoxy, e.g. tetraethoxysilane, methyltrimethoxysilane or phenyltrimethoxysilane. Examples of suitable comonomers here are styrene, acrylonitrile and crosslinking or graft-active monomers having more than one polymerizable double bond, such as diallyl phthalate, divinylbenzene, butanediol diacrylate or triallyl (iso)cyanurate. The hard components are derived in general from styrene, alpha-methylstyrene and copolymers thereof, acrylonitrile, methacrylonitrile and methylmethacrylate preferably being used as comonomers. Preferred core-shell graft rubbers contain a soft core and a hard shell or a hard core, a first soft shell and at least one further hard shell. Functional groups, such as carbonyl, carboxyl, anhydride, amido, imido, carboxylic ester, amino, hydroxyl, epoxy, oxazoline, urethane, urea, lactam or halobenzyl groups, are preferably incorporated here by adding suitable functionalized monomers in the polymerization of the final shell. Suitable functionalized monomers are, for example, maleic acid, maleic anhydride, mono- or diesters of maleic acid, tert-butyl (meth)acrylate, acrylic acid, glycidyl (meth) acrylate and vinyloxazoline. The amount of monomers having functional groups is in general from 0.1 to 25, preferably from 0.25 to 15%, by weight, based on the total weight of the core-shell graft rubber. The weight ratio of soft to hard components is in general from 1:9 to 9:1, preferably from 3:7 to 8:2.

Such rubbers are known per se and are described, for example, in EP-A 208 187.

The polymer compositions useful in this invention may also contain a flame retardant synergist. The composition achieves improved dimensional stability and improved melt stability due, at least in part, to use of the flame retardant synergist. Any flame retardant synergist known in the art may be used. It is preferred that an antimony compound be used but the common choice of $Sb_2O_3$ performs poorly. Sodium antimonate is more preferred. Even more preferred is $NaSbO_3$ that is substantially free of $Sb^{+3}$ or less than 1 mole % of $Sb^{+3}$ based on the total mole percentages of antimony in the sodium antimonate.

Sodium antimonate is normally justified in the art as being a sodium-neutralized version of $Sb_2O_3$ but the importance of $Sb^{+3}$ level and the desire to reduce rather than increase the amount of synergist suggest this different mechanism, reducing catalytic activity of the Sb species.

It is accordingly preferred that the ratio of flame retardant (bisimide) to flame retardant synergist (sodium antimonate) is optimized at a much higher weight ratio (5:1 to 10:1, preferably 8:1) than is commonly practiced in the art (3:1 to 4:1).

It can also be shown that melt stability of the composition useful in the invention can be further improved by addition of a phosphorous-based compound. The phosphorous-based compounds include, but are not limited to, one or more phosphites or phosphonites wherein at least one of the P—O bonds is attached to an aryl radical. Such compounds may be

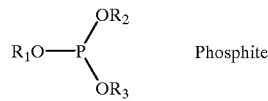

represented by the formulas
where at least one of $R_1$, $R_2$ and $R_3$ is an aryl radical of 6 to 30 carbon atoms and any other(s) of $R_1$, $R_2$ and $R_3$ are H or alkyl of 1 to 30 carbon atoms, or

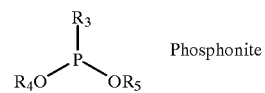

where at least one of $R_3$, $R_4$ and $R_5$ is an aryl radical of 6 to 30 carbon atoms.

Phosphites are preferred within the context of this invention.

Even more preferred are, for example, commonly available symmetrical triaryl esters of phosphorous acid which may be used are triphenyl phosphite; tris(nonylphenyl) phosphite; and tris(2,4-di-t-butylphenyl) phosphite (Irgafos 168 from Ciba-Geigy Corporation)). The most preferred symmetrical ester of phosphorous acid is bis(2,4-di-t-butylphenyl) pentaerythritol diphosphite (Ultranox 626—a trademark of General Electric Co.).

Other examples of phosphorous-based compounds which may be used include, but are not limited to, Ultranox® 633 phosphite, (General Electric Chemicals), Ethanox® 398 phosphonite (Ethyl Corporation) and Sandostab® P-EPQ phosphonite (Sandoz Chemicals).

The phosphorous compounds may be functioning by inhibiting the metal catalyst system present in the PCT. While much is known about use of phosphorous compounds in stabilizing polyester systems, it is not generally recognized as a way to stabilize flame retardants.

Without limiting the invention, it is suggested that all these changes may function by reducing the catalytic activity of the blend to a much lower level than is required for lower melting polyesters. This is in contrast to the usual concern of buffering the system from acidic HBr release which can directly attack the polyester.

Phenoxy compounds may also be used in the invention. These phenoxy compounds comprise a diepoxide monomer having the structural formula:

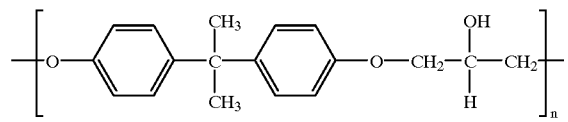

Examples of phenoxy compounds include the polyhydroxyether of bisphenol A which is produced from 2,2'-bis (4-hydroxy-phenyl) propane and epichlorohydrin. Preparation of such polymers is described in U.S. Pat. No. 3,356,646.

It is preferred that phenoxy compounds useful in the invention comprise 1 to 10%, preferably 2 to 5% by weight of the total composition. It is also preferred that the phenoxy compound(s) of the invention have an Mn of 10,000 to 20,000.

It is understood that other additives such as other stabilizers, other flame retardants (FR), flame retardant synergists, tougheners, epoxy compounds, branching agents, mold release agents, nucleating agents, reinforcing agents such as reinforcing fibers, (such as carbon or glass fibers) fillers, antioxidants and colorants such as carbon black, might also be desirable in such formulations. These may be added either during or after polymerization depending on the nature of the additive.

Such additives are generally present at 0.1 to about 40 weight % total, preferably 0.1 to about 20 weight %, based on the total weight of the copolyester composition.

It is also preferable that 0.1 to 5.0 weight %, preferably less than 2.0 weight %, of one or more branching agents is included within the context of this invention, including but not limited to, trimellitic acid, trimellitic anhydride, pyromellitic anhydride, multifunctional epoxy compounds and multi-functional phenoxy compounds, and the like. If the branching agent is a phenoxy compound, 2.0 to 5.0 weight % is preferred.

Examples of reinforcing agents are reinforcing fibers such as glass fibers and carbon fibers, mica, clay, talc, wollastonite, and calcium carbonate.

A particularly preferred reinforcing agent is glass fiber. It is preferable that the glass fibers be present in the polyester composition at from 0.1 to 45%, preferably 10 to 40%, by weight based on the total weight of said polyester composition.

Glass fibers suitable for use in the polyester compositions useful in the invention may be in the form of glass filaments, threads, fibers, or whiskers, etc., and may vary in length from about ⅛ inch to about 2 inches. Chopped glass strands having a length of about ⅛ inch to about ¼ inch are preferred. Such glass fibers are well known in the art. Of course, the size of these glass fibers may be greatly diminished depending on the blending means employed, even to lengths of 300 to 700 microns or lower.

It is preferred that the glass fibers are coated with polyurethane.

The polyester compositions useful in the invention may be reinforced with a mixture of glass and other reinforcing agents as described above, such as mica or talc, and/or with other additives.

The components of the copolyester composition useful in the invention may be blended and/or mixed by any suitable technology known in the art. Compounding temperatures must be at least the melting point of the polyester. For example, the polyester can be mixed dry in any suitable blender or tumbler with the other components and the mixture melt-extruded. The extrudate can be chopped. If desired the reinforcing material can be omitted initially and added after the first melt extrusion, and the resulting mixture can then be melt extruded.

The copolyester useful in this invention may be melt processed and extruded, injection molded, or compression molded into a variety of shapes and forms including fibers, molded parts, bottles, pellets, containers, sheeting, film and the like. The product is especially suitable as an injection molding material for producing molded articles.

The following definitions of terms are applicable throughout this invention unless otherwise specified:

Abbreviations for the tables are as follows; other abbreviations and definitions may otherwise appear herein:

Flame Retardant 1—(FR1)—N,N'-ethylenebis (tetrabromophthalimide) which is reaction product of ethylene diamine and tetrabromophthalic anhydride; flame retardant of the invention;

Flame Retardant 2—(FR2)—brominated polystyrene; comparative flame retardant;

Flame Retardant Synergist 1—(FRS1)—sodium antimonate, 5 μm, has about 3% $Sb^{+3}$;

Flame Retardant Synergist 2—(FRS2)—sodium antimonate, 5 μm, has less than 1% $Sb^{+3}$;

Flammability Measurement—UL94—Flammability tests were performed following the procedure of Underwriter's Laboratory Bulletin 94 entitled "Tests for Flammability of Plastic Materials, UL94"; a rating of "V0" means that a flame will self-extinguish within 10 seconds after each ignition without dripping molten polymer; a rating of "V1" means that a flame will self-extinguish within 30 seconds after each ignition without dripping molten polymer; a rating of "V2" means that a flame will self-extinguish within 30 seconds after each ignition and may have flaming drips which ignite dry absorbent surgical cotton; other details are described more fully in UL94;

Glass Fibers Type 1—(GF1)—10 micron diameter, amino silane coupler, and thermoplastic polyurethane coating;

Glass Fibers Type 2—(GF2)—10 micron diameter, amino silane coupler, and thermoplastic polyurethane coating;

GPC—gel permeation chromatography;

HDT—heat deflection temperature as determined according to ASTM Method D648 at 264 psi loading;

Inherent viscosity or "I.V."—refers to inherent viscosity expressed in dL/g measured as described herein;

Melting Point—determined by DSC (differential scanning calorimeter);

Molecular Weight (Mn)—number average molecular weight unless otherwise specified;

PCT—poly(cyclohexylenedimethylene terephthalate);

Plasticizer A—(PL A)—(polyethylene glycol dilaurate);

Plasticizer B—(PL B)—polyethyleneglycol-di-2-ethylhexanoate;

Rubber Impact Modifier 1—(RIM1)—epoxy functional rubber, ethyl-methyl acrylate-glycidyl methacrylate copolymer Rubber Impact Modifier 2—(RIM2)—ethyl-methyl acrylate copolymer Stabilizer 1—(ST 1)—epoxy resin (polymer of tris(4-glycidyloxyphenyl) methane);

Stabilizer 2—(ST 2)—tetrakis-[methylene-(3,5-di-tert-butyl-4-hydroxyhydro-cynnamate)];

Stabilizer 3—(ST 3)—[bis(2,4-di-t-butylphenyl) pentaerythritol diphosphite;

Stabilizer 4—(ST4)—Phenoxy PKHH;

Tensile Elongation at Break—measured according to ASTM 638 using 0.125 inch thick test specimens All percentages expressed herein refer to weight percentages unless otherwise specified.

EXAMPLES

The glass fiber reinforced (GFR) PCT blends of this work were prepared by extrusion compounding using a twin screw extruder at temperatures of 305° C. The resulting pellets were injection molded into tensile and flexural bars for use in mechanical and flammability property testing. Melt stability was determined on these blends by drying a small sample of the compounded pellets. Adequate drying can be obtained by drying in a vacuum oven overnight at 80° C., or by drying for 4 hours at 125° C. in a hot air circulating oven. The dried pellets were then loaded into a Tinius Olsen melt indexer or capillary rheometer and held for 10 minutes at 305° C. melt temperature, then analyzed by gel permeation chromatography. The melt stability of these blends was shown by the retention of number average molecular weight (Mn) and weight average molecular weight (Mw) after 10 minutes at 305° C.

Good melt stability is characterized by a loss of less than about 15% of the original Mn and Mw, after exposure for 10 minutes, the original molecular weights being defined as that at zero time. Blends with less than this degree of melt stability may still be useful, but are correspondingly inferior.

The blends in the Examples below are described as follows. Percentages are by weight of the total composition.

Example 1
Blends A–D in Table 1 are described as follows:
Blend A is described as follows:
- 30.0% GF 1
- 16.0% FR1
- 2.0% FRS2.
- 4.0% PL A
- 3.0% ST4
- 0.5% polyethylene wax
- 0.25% ST3
- 0.25% ST2, and
- PCT in an amount sufficient for the composition to total 100 weight %.

Blend B is described as follows:
- Same as Blend A except containing 3.5% RIM1 and 3.5% RIM2.

Blend C is described as follows:
- Same as Blend A except containing 3.5% RIM1 and 2.5% RIM2.

Blend D is described as follows:
- Same as Blend A except containing 2.5% RIM1 and 2.5% RIM2.

TABLE 1

|  | Blend A | Blend B | Blend C | Blend D |  |
| --- | --- | --- | --- | --- | --- |
| % RIM1 | 0 | 3.5 | 3.5 | 2.5 |  |
| % RIM2 | 0 | 3.5 | 2.5 | 2.5 |  |
| Tensile Elongation | 1.5 | 2.4 | 2.3 | 2.2 | (%) |
| HDT | 263 | 247 | 242 | 255 | (@264 psi) |
| Flammability | V0 | V2 | V0 | V0 | (UL-94 type) |

Table 1 shows that the brominated phthalimide FR1 based system can be toughened in this manner while retaining good HDT.

Example 2
Blends E–1 in Table 2 are described as follows:
Blend E is described as follows:
- 30.0% GF1
- 16.0% FR1
- 2.0% FRS2
- 4.0% PL A
- 3.0% ST4
- 0.5% polyethylene wax
- 0.25% ST2
- 0.25% ST3, and
- PCT in an amount sufficient for the composition to total 100 weight %.

Blend F is described as follows:
- Same as Blend E except containing 1.0% RIM1 and 3.0% RIM2.

Blend G is described as follows:
- Same as Blend E except containing 3.0% RIM1 and 3.0% RIM2.

Blend H is described as follows:
- Same as Blend E except containing 1.0% RIM1 and 9.0% RIM2.

Blend I is described as follows:
- Same as Blend E except containing 3.0% RIM1 and 9.0% RIM2.

TABLE 2

|  | Blend E | Blend F | Blend G | Blend H | Blend I |  |
| --- | --- | --- | --- | --- | --- | --- |
| % RIM1 | 0 | 1 | 3 | 1 | 3 |  |
| % RIM2 | 0 | 3 | 3 | 9 | 9 |  |
| Tensile Elongation | 1.4 | 2.2 | 2.6 | 2.5 | 2.3 | (%) |
| HDT | 260 | 256 | 253 | 246 | 238 | (@264 psi) |
| Flammability | V0 | V0 | V0 | V1 | Fail | (UL-94 type) |

Table 2 shows toughening with increasing impact modifer well before HDT and flammability are harmed in brominated phthalimide (FR1) system.

Example 3
Blends J–N in Table 3 are described as follows:
Blend J is described as follows:
- 30.0% GF2
- 14.0% FR2
- 3.5% FRS1
- 3.75% PL B
- 0.5% ST1
- 2.0% Talc
- 0.25% ST2
- 0.25% ST3, and
- PCT in an amount sufficient for the composition to total 100 weight %.

Blend K is described as follows:
- Same as Blend J except containing in addition 1.25% RIM1 and 3.75% RIM2 and with the FR2 adjusted to 13.0% and FRS1 is adjusted to 3.0%.

Blend L is described as follows:
- Same as Blend J except containing in addition 1.25% RIM1 and 3.75% RIM2 and with the FR2 adjusted to 15.0% and FRS1 is adjusted to 4.0%.

Blend M is described as follows:
- Same as Blend J except containing in addition 2.5% RIM1 and 7.5% RIM2 and with the FR2 adjusted to 13.0% and the FRS1 adjusted to 4.0%.

Blend N is described as follows:
- Same as Blend J except containing in addition 2.5% RIM1 and 7.5% RIM2 and with the FR2 is adjusted to 15.0% and the FRS1 adjusted to 3.0%.

TABLE 3

|  | Blend J | Blend K | Blend L | Blend M | Blend N |  |
| --- | --- | --- | --- | --- | --- | --- |
| % RIM1 | 0 | 1.25 | 1.25 | 2.5 | 2.5 |  |
| % RIM2 | 0 | 3.75 | 3.75 | 7.5 | 7.5 |  |
| % FR2 | 14 | 13 | 15 | 13 | 15 |  |
| % FRS1 | 3.5 | 3 | 4 | 4 | 3 |  |
| Tensile Elongation | 2.1 | 2.5 | 2.1 | 2.1 | 2.2 | (%) |
| HDT | 246 | 246 | 242 | 213 | 196 | (@264 psi) |
| Flame | V0 | V1 | V0 | V0 | V1 | (UL-94 type) |

Table 3 shows that the brominated polystyrene based system cannot be toughened by this method without sacrificing flammability or heat deflection temperature.

The invention has been described in detail with particular reference to preferred embodiments thereof, but it will be understood that variations and modifications can be effected within the spirit and scope of the invention.

What is claimed is:

1. A process for improving the toughness of a polymer composition consisting essentially of blending:
   (A) a polyester comprising:
      (1) terephthalic acid in the amount of 85 to 100 mole % based on the mole percentages of the dicarboxylic acid component equaling a total of 100 mole %;
      (2) a glycol component comprising from about 60 to 100 mole % 1,4-cyclohexanedimethanol based on the mole percentages of the glycol component equaling a total of 100 mole %;
   (B) from about 5 to 7 weight % of one or more rubber impact modifiers selected from the group consisting of copolymers of ethylene, methyl acrylate, glycidyl methacrylate and core-shell graft rubber impact modifiers wherein said core-shell graft rubber impact modifiers contain soft components and hard components in a weight ratio of from 1:9 to 9:1
   (C) one or more halogenated organic compounds containing at least one imide group having a melting point of greater than 240° C. selected from N,N'-alkylenebis (tetrahalophthalimides) having the formula:

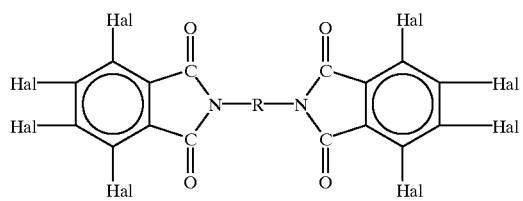

wherein R is a C1–C6 alkyl group, and Hal represents a halogen atom;
   (D) reinforcing fiber; and
   (E) a phosphite selected from the group consisting of triphenyl phosphite, tris(nonylphenyl) phosphite, and tris(2,4-di-t-butylphenyl) phosphite, and bis(2,4-di-t-butylphenyl) pentaerythritol diphosphite and wherein said blend has a tensile elongation at break of at least 2.2.

2. The process of claim 1 wherein said polyester comprises terephthalic acid in an amount of 90 to 100 mole %.

3. The process of claim 1 wherein said acid component comprises repeat units of from 0 to 15 mole % or less of one or more other dicarboxylic acids.

4. The process of claim 3 wherein said one or more dicarboxylic acids is selected from cyclohexanedicarboxylic acid, isophthalic acid, 1,4-cyclohexanediacetic acid, diphenyl-4,4'-dicarboxylic acid, succinic acid, glutaric acid, adipic acid, azelaic acid, naphthalenedicarboxylic acid, or sebacic acid.

5. The process of claim 3 wherein said one or more dicarboxylic acid is selected from isophthalic acid, naphthalenedicarboxylic acid, cyclohexanedicarboxylic acid or naphthalene dicarboxylate.

6. The process of claim 5 wherein said dicarboxylic acid is selected from isophthalic acid and naphthalenedicarboxylic acid.

7. The process of claim 6 wherein said dicarboxylic acid comprises isophthalic acid.

8. The process of claim 5 wherein said acid component comprises cyclohexanedicarboxylic acid.

9. The process of claim 6 wherein said acid component comprises naphthalenedicarboxylic acid.

10. The process of claim 1 wherein said glycol component comprises 80 to 100 mole % 1,4-cyclohexanedimethanol.

11. The process of claim 10 wherein said glycol component comprises 90 to 100 mole % 1,4-cyclohexanedimethanol.

12. The process of claim 10 wherein said glycol component comprises up to 20 mole % of one or more other aliphatic or alicyclic glycols.

13. The process of claim 12 wherein said glycol component comprises up to 10 mole % of one or more other aliphatic or alicyclic glycols.

14. The process of claim 13 wherein said one or more other glycols is selected from the group consisting of cycloaliphatic diols having 6 to 20 carbon atoms and aliphatic diols having 2 to 20 carbon atoms.

15. The process of claim 14 wherein said one or more other glycols is selected from the group consisting of ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, decalin diol and 2,2-bis-(4-hydroxypropoxyphenyl)-propane.

16. The process of claim 13 wherein said one or more other glycols is selected from the group consisting of ethylene glycol, diethylene glycol, triethylene glycol, propanediol, butanediol, pentanediol, hexanediol, and tetramethylcyclobutanediol.

17. The process of claim 15 wherein said one or more other glycols comprises ethylene glycol in an amount less than 20 mole %.

18. The process of claim 17 wherein said one or more other glycols comprises ethylene glycol in an amount less than 10 mole %.

19. The process of claim 1 wherein said copolyester has a melting point of 260° C. or more.

20. The process of claim 19 wherein said copolyester has a melting point of 270° C. or more.

21. The process of claim 19 wherein said copolyester has a melting point of 260° C. to 310° C.

22. The process of claim 1 wherein said polymer composition undergoes less than a 50% loss in number average molecular weight as determined by gel permeation chromatography when melt processed at about 25° C. above the crystalline melting temperature for 10 minutes.

23. The process of claim 22 wherein said polymer composition undergoes less than a 25% loss in number average molecular weight as determined by gel permeation chromatography when melt processed at about 25° C. above the crystalline melting temperature for 10 minutes.

24. The process of claim 1 wherein said polymer composition comprising one or more additives selected from the group consisting of stabilizers, flame retardants, flame retardant synergists, tougheners, epoxy compounds, mold release agents, nucleating agents, reinforcing agents and branching agents.

25. The process of claim 1 wherein said halogenated organic compounds containing at least one imide group have melting points above 240° C.

26. The process of claim 25 wherein said organic compounds containing at least one imide group have melting points above 300° C.

27. The process of claim 25 wherein said organic compounds containing at least one imide group comprise N,N'-arylenediphthalimides wherein the arylene group includes phenylene, diphenylene, naphthylene, and sulfone bridged bisphenyls; tetrabrominated phthalimides; N,N'bis (dibromocyclohexanedicarboxyimides) with bridging groups; and N,N'-alkylenebis(tetrahalophthalimides).

28. The process of claim 1 wherein said halogen atom is selected from the group consisting of chlorine and bromine.

29. The process of claim 28 wherein said halogen atom is bromine.

30. The process of claim 1 wherein R is ethyl.

31. The process of claim 1 wherein said imide group containing compounds are brominated phthalimides made from aromatic or aliphatic diamines and from tetrabromophthalic anhydride or tetrabromophthalic acid.

32. The process of claim 31 wherein said diamines are selected from the group consisting of ethylene diamine and hydrazine.

33. The process of claim 31 wherein said imide group containing compound is N,N'-ethylenebis (tetrabromophthalimide).

34. The process of claim 1 further including blending (F) sodium antimonate which is substantially free of $Sb^{+3}$.

35. The process of claim 34 wherein said sodium antimonate contains less than 1 mole percent of $Sb+3$ based on the total mole % of antimony present in the sodium antimonate.

36. The process of claim 34 wherein the amount of said imide group containing compound(s) and sodium antimonate in the composition results in a weight ratio of 5:1 to 10:1.

37. The process of claim 36 wherein the amount of said imide group containing compound(s) and sodium antimonate present in said composition results in a weight ratio of 8:1 of brominated phthalimide(s):sodium antimonate.

38. The process of claim 1 wherein said phosphite is bis(2,4-di-t-butylphenyl)pentaerythritol diphosphite.

39. The process of claim 1 comprising 1 to 10% by weight of phenoxy compound(s) based on the weight of the total composition.

40. The process of claim 39 comprising 2 to 5% by weight of phenoxy compound(s) based on the weight of the total composition.

41. The process of claim 39 wherein said one or more phenoxy compounds have an Mn of 10,000 to 20,000.

42. The process of claim 39 wherein said phenoxy compound comprises the structural formula:

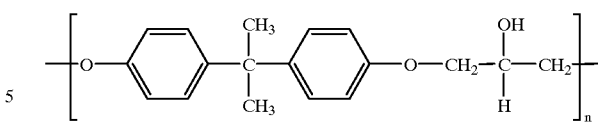

wherein n is 10 to 100.

43. The process of claim 42 wherein said phenoxy compound is the polyhydroxyether of bisphenol A which is produced from 2,2'-bis(4-hydroxy-phenyl) propane and epichlorohydrin.

44. The process of claim 24 wherein said reinforcing agents are selected from the group consisting of glass fibers, carbon fibers, mica, clay, talc, wollastonite, and calcium carbonate.

45. The process of claim 1 wherein said reinforcing fibers is selected from the group consisting of carbon fibers and glass fibers.

46. The process of claim 45 wherein said reinforcing agent is glass fiber.

47. The process of claim 46 wherein said glass fibers are present at from 0.1 to 45% by weight based on the total weight of the polymer composition.

48. The process of claim 46 wherein said glass fibers are chopped glass strands having a length of from about ⅛ inch to about 2 inches.

49. The process of claim 48 wherein said glass fibers are chopped glass strands having a length of from about ⅛ inch to about ¼ inch.

50. The process of claim 46 wherein said glass fibers are coated with polyurethane.

51. The process of claim 1 further including the step of forming a shaped article with said polyester composition.

52. The process of claim 51 wherein said shaped article is formed by melt processing.

53. The process of claim 52 wherein said shaped article is formed by extrusion molding.

54. The process of claim 52 wherein said shaped article is formed by injection molding.

55. The process of claim 52 wherein said shaped article is an electronic component.

56. The process of claim 52 wherein said shaped article is selected from the group consisting of fibers, molded parts, bottles, pellets, containers, sheeting, and film.

* * * * *